United States Patent [19]
Cappelen et al.

[11] Patent Number: 5,164,922
[45] Date of Patent: Nov. 17, 1992

[54] DEVICE FOR FIRMLY HOLDING SEISMIC MEANS, ESPECIALLY SOURCES OF SEISMIC ENERGY

[75] Inventors: Hans Cappelen, Blommenholm; Øyvind Sørbotten, Haugesund; Odd O. Vatne, Oslo, all of Norway

[73] Assignee: Geco A.S., Stavanger, Norway

[21] Appl. No.: 776,209

[22] Filed: Oct. 15, 1991

[30] Foreign Application Priority Data

Oct. 17, 1990 [NO] Norway ............... 904484

[51] Int. Cl.⁵ .................. G01V 1/38; H04R 23/00
[52] U.S. Cl. ................... 367/144; 367/153; 367/173
[58] Field of Search ............ 367/15, 20, 153–156, 367/144, 146, 172, 173; 114/244, 253; 181/110, 111

[56] References Cited

U.S. PATENT DOCUMENTS

| | | | |
|---|---|---|---|
| 3,482,646 | 12/1967 | Brown et al. | 367/143 |
| 4,858,205 | 8/1989 | Harrison | 367/144 |
| 4,956,822 | 9/1990 | Barber et al. | 362/23 |
| 4,970,046 | 11/1990 | Dolengowski | 367/144 X |
| 5,051,966 | 9/1991 | Gjestrum et al. | 367/153 |

FOREIGN PATENT DOCUMENTS

| | | |
|---|---|---|
| 0368472A1 | 5/1989 | European Pat. Off. . |
| 2225428A | 10/1989 | United Kingdom . |
| WO8303647 | 4/1983 | World Int. Prop. O. . |
| WO87/01775 | 9/1986 | World Int. Prop. O. . |

Primary Examiner—Brian S. Steinberger
Attorney, Agent, or Firm—Jacobson, Price, Holman & Stern

[57] ABSTRACT

In seismic surveys at sea, with seismic devices, especially sources of seismic energy being towed behind a vessel and kept at a mutual configuration relative to each other, and with the devices being suspended from a buoyancy member (1) mechanical structure of the equipment permits undesirable forces which influence the sources of seismic energy (3), especially during firing, to be absorbed. Mutually arranged flexible, resilient members (4) are provided between the suspension line of the seismic devices (3) and the seismic devices (3) and/or between the seismic devices. Seismic devices are supported on two or more rigid fastening members (5) and flexible resilient members (4) extend between the fastening members and the suspension line. The flexible resilient members (4) preferably extend in a curved path between the fastening members (5) and the members together form an integrated unit.

17 Claims, 3 Drawing Sheets

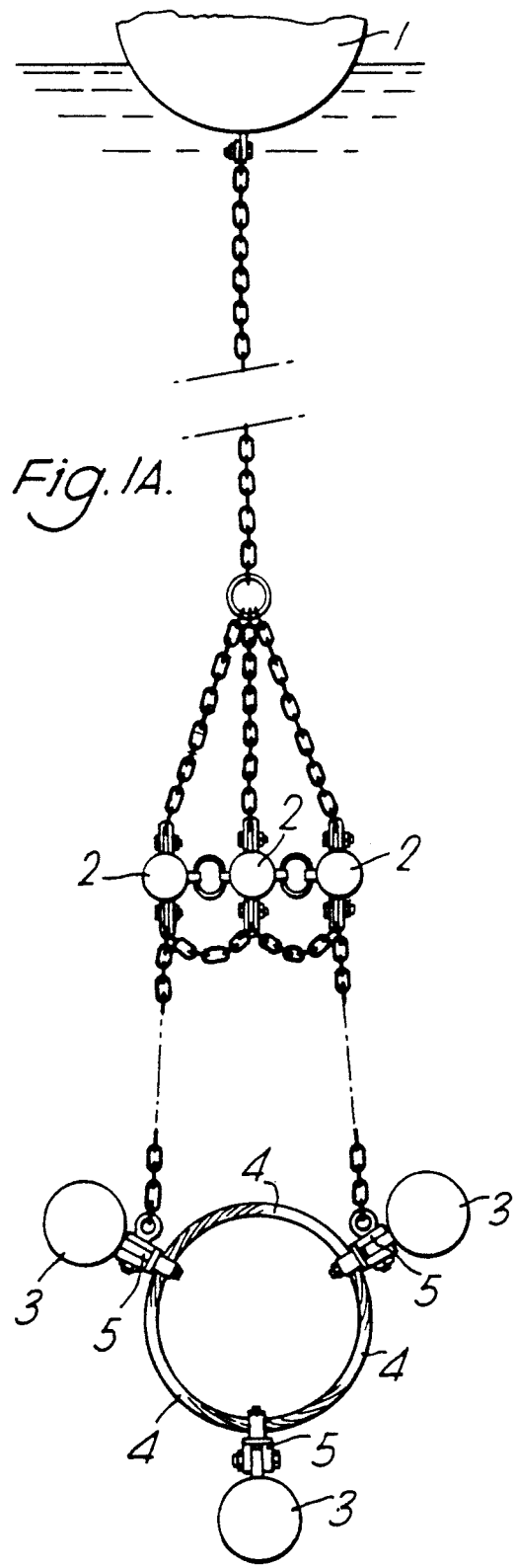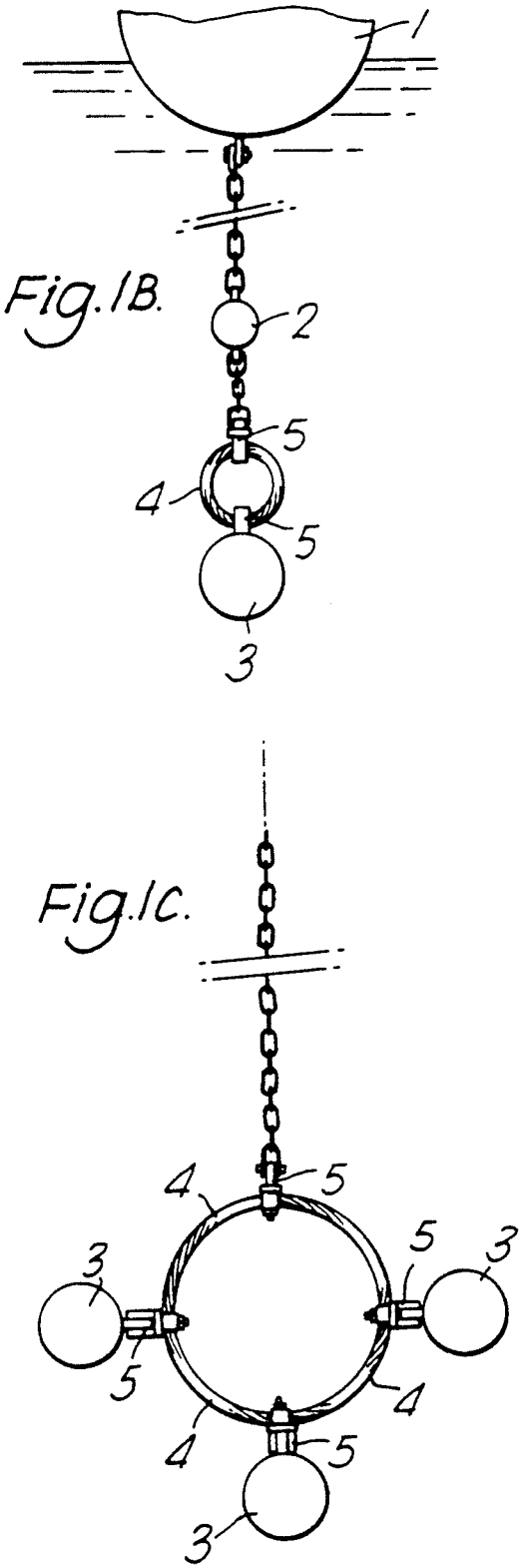

DEVICE FOR FIRMLY HOLDING SEISMIC MEANS, ESPECIALLY SOURCES OF SEISMIC ENERGY

BACKGROUND OF THE INVENTION

The invention relates to a device for firmly holding seismic means, especially sources of seismic energy, in a defined manner, and more particularly is especially intended for use when a plurality of seismic means are to be used in mutual cooperation.

In seismic surveys at sea one or a plurality of streamers, i.e. cables comprising seismic receiver equipment, e.g. hydrophones, as well as one or a plurality of assemblies of sources of seismic energy, are towed behind a seismic vessel. Depending on conditions of usage and parameters the of survey the sources of seismic energy may comprise a varying number of water guns, air guns, or the like. A typical source of seismic energy is an air gun comprising a cylindrical housing with one or a number of chambers. The chambers are charged with a compressed medium under high pressure and this medium is abruptly released to expand in the environment so that a forceful wavefront is formed which will oscillate more or less in the water. This discharge of energy which is repeated at frequent intervals constitutes a high load on surrounding mechanical equipment and will also influence the surrounding cooperating sources of energy unless special measures are taken or a defined mutual positioning is ensured.

These conditions entail high demands to the equipment being towed in the water, both as regards its structure and maintenance, and in seismic surveys a heavy item of expenditure and even an obstacle to carrying out a survey is replacement of equipment or adjustment of misalignments caused by the shock loads which are triggered by the sources of seismic energy.

Efforts were previously made to improve conditions as regards the mechanical structure and positioning of sources of seismic energy in a tow. In Norweigian patent application No. 893950, corresponding to U.S. Pat. No. 4,970,046, e.g. a frame means for firmly holding air guns in a determined configuration within a frame is disclosed, which means also comprises shock absorbing links or members in the suspension means for the guns to dampen impacts and shocks caused by firing of the gun. The structure which was developed, is relatively complicated and the design of the shock absorbing members also has to be adapted to the used sources, so that this equipment will not only be very expensive, but in order to be efficient it will also involve high costs for maintenance and adaptation.

In the applicant's NO patent application No. 88 5044 corresponding to U.S. Pat. No. 5,051,966 a frame structure is disclosed which is in principle of the same kind as the frame structure disclosed in Norweigian patent application No. 89 3950, i.e. a so called "cluster"—arrangement in which the air guns are to be firmly held in an accurately defined spaced relationship to cooperate correctly. In this structure shock absorbing members absorbing the most essential pulling forces in connection with firing are integrated in the holding means proper for separate guns, but this is also a permanent structure which has to be adapted to the calculated parameters.

BRIEF SUMMARY OF THE INVENTION

It is an object of the present invention to provide a device for firmly holding seismic devices, such as sources of seismic energy, in a defined manner, in which the shocks, impacts and pressure forces to which the seismic equipment is subjected during firing will be absorbed, at the same time as the device will substantially dampen the created loads, independent of their magnitude and direction, so that a device of a much simpler kind than those previously known will be achieved and with maintenance tasks being kept at a minimum.

This object is achieved by a device as mentioned above, wherein the basic inventive idea is that between the seismic device and the members from which it should be "isolated", flexible springy members are provided, which absorb shock loads in all directions. At the same time these members are sufficiently rigid to form a carrying device. The invention, thus, differs clearly from the idea which was used in Norweigian patent application No. 89 3950 as well as from Norweigian patent application No. 88 5044, where the question is only one of absorbing forces in a determined direction, i.e. the forces should be prevented from propagating within a rigid structure, whereas the design according to the invention is also intended for absorption of traversing forces. The invention may be designed in a plurality of different manners, it may be provided to form an intermediate link between the source of seismic energy and the carrying members, or it may be used like a stable, yet springy frame structure.

BRIEF DESCRIPTION OF THE DRAWING

The invention is described in more detail below with reference to the embodiments shown in the accompanying drawings, wherein:

FIGS. 1A, 1B and 1C are schematic elevational views of three different embodiments of the invention.

DETAILED DESCRIPTION

Figure 2:
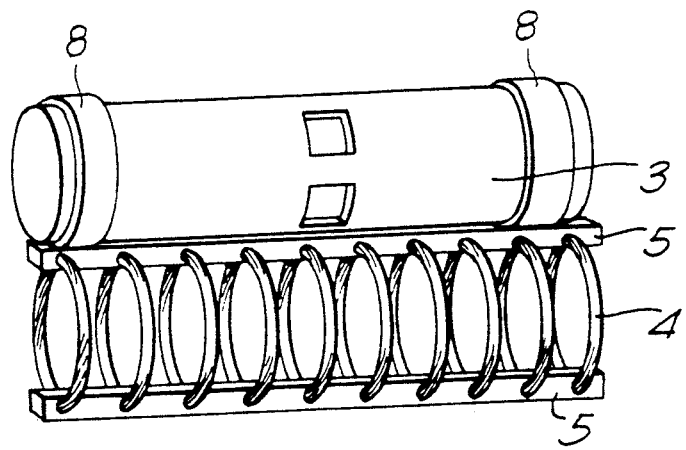
FIGS. 2 and 3 are perspective views of two different embodiments illustrating a detail of the device according to the invention.

The illustrative arrangement shown in the drawing comprises variations of a spring member of the kind that is, e.g. disclosed in Norweigian patents Nos. 82 1262, corresponding to International Application No. PCT/No 86,00012 (WO 83/03647) and 85 3735 corresponding to International Application No. PCT/No 86,00069 (WO 87/01775). Other variants of spring members based on the use of fastening plates and steel cables, in which a steel cable is e.g. passed through the fastening plates in the shape of a helical line are also previously known and are part of known technology. Use of other members than steel cables for spring members, e.g. rubber-elastic members or leaf springs, may, however, be considered but the known design with use of steel cables for spring elements proved to be especially suitable and cost saving.

In FIGS. 1A and 1B a buoyance means 1 is indicated at the surface of the water to be towed in a conventional manner behind a seismic survey vessel. An arrangement of sources of seismic energy with one or a plurality of suspended air guns, generally indicated by numeral 3, is suspended from buoyancy means 1. Conforming to the usual practice, necessary conduits for air supply and control of the sources of seismic energy will be integrated in the suspending line arrangement. Such equipment is generally indicated by numeral 2 in FIGS. 1A and 1B.

In the embodiment shown in FIG. 1A three air guns 3 are provided in a frame structure to be kept at a defined predetermined mutual distance, and these three air guns are to be kept mutually unaffected by the loads occurring when the guns are fired. With this objective the whole frame member is designed to be a device according to the invention. The frame is thus formed from a number of circular steel cable members, which together form a flexible resilient circular frame designated by numeral 4. At the fastening points of the air guns a rigid fastening member 5 is provided to form an integrated part of the frame device, i.e. the device according to the invention. The steel cable members can thus be passed through and/or fastened to members 5 and/or they may be screwed onto or clamped to members 5 or the spring members 4 may be pieces of cable which are molded or screwed onto members 5 to form an integrated frame which may be adapted to the desired purpose. The fastening means may be plate members extending in the longitudinal direction of air guns, i.e. into the plane of the paper, and providing a hold for several such circular cable frames, dependent on the rigidity which is desired for the frame. In the embodiment shown in FIG. 1A the suspending line arrangement is fastened directly on two such fastening members 5 to provide a comparatively rigid suspension. Al alternative is shown in FIG. 1C. The air guns are here placed in a slightly different manner relative to each other and the line suspension arrangement is provided in a springy fastening member 5 so that suspension from only one line is used. In FIG. 1B a possible suspension of only one air gun or a plurality of air guns to be provided one behind the other, normal to the plane of the paper is illustrated. The guns may then be suspended from a device according to the invention with fastening members 5 being diametrically arranged and with the resilient members 4 forming arches on both sides.

Figure 5:
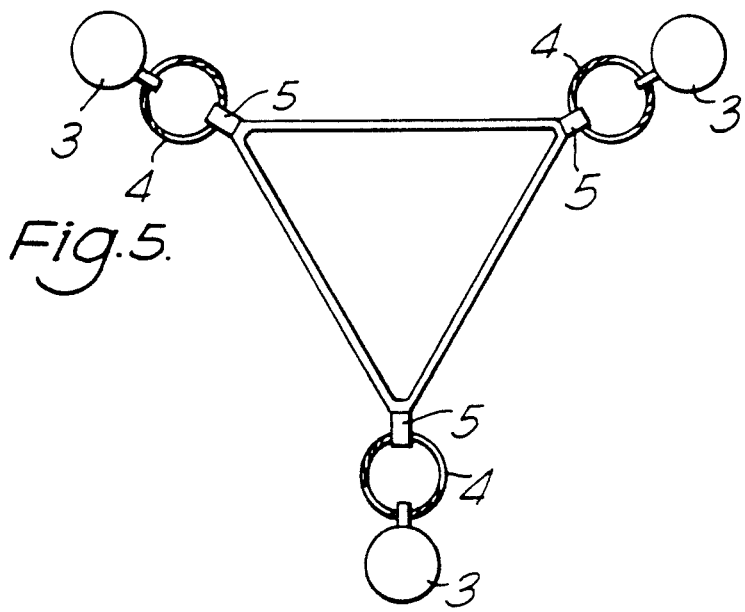

FIG. 5 illustrates a device according to the invention which is designed in a different manner. A rigid frame structure is used here, which is triangularly shaped in the shown embodiment. In the corners of this frame structure resilient means 4 corresponding to that shown in FIG. 1B are provided to hold air guns 3. In such a design forces acting on the air guns in all directions will be absorbed by spring members 4, and a slightly more individual adaptation of the spring forces and absorption of load will be possible at the individual guns.

Figure 6:
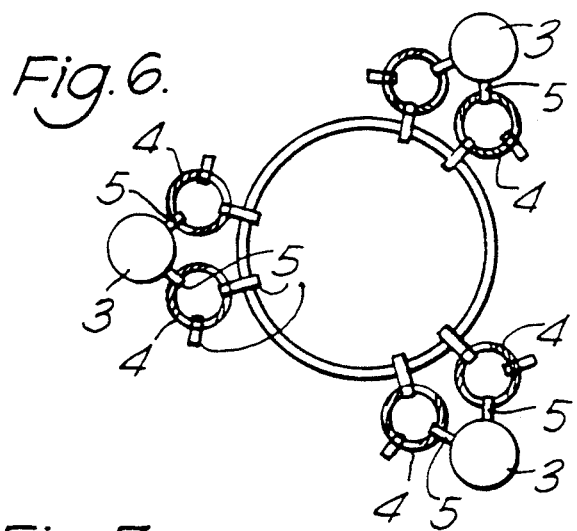

FIG. 6 another variant is shown, in which a rigid frame 7 is used. This frame is circular in the drawing, but it would also be possible to use, e. g. a square rigid frame, or the like. Means of the kind shown in FIG. 1B are fastened to this frame, but there are three pairs of spring members 4 mounted or connected to frame 7, and three fastening members 5 on each fastening members 5 on each resilient spring member 4. Between two adjacent fastening members 5 on each pair of members 4 an air gun 3 is fastened. In this manner a variant of the embodiment of FIG. 5 is achieved, with the air guns being rigidly held.

Figure 3:
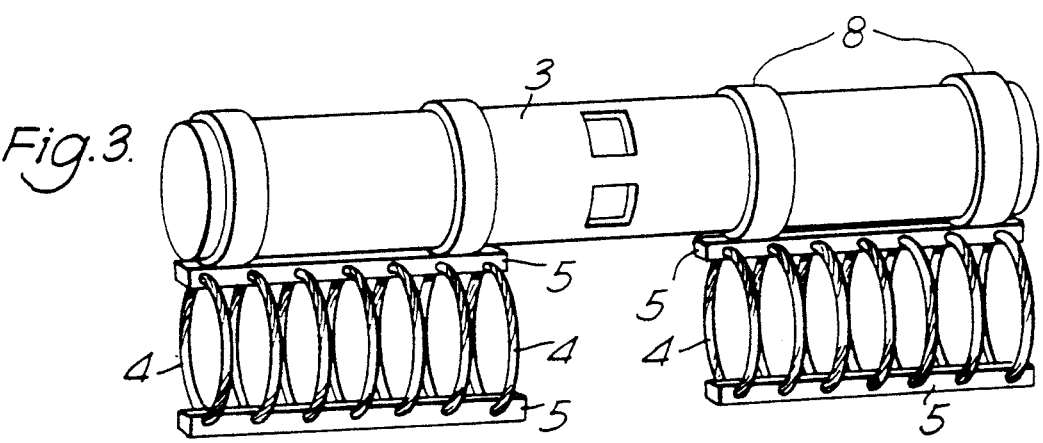
Figure 4:
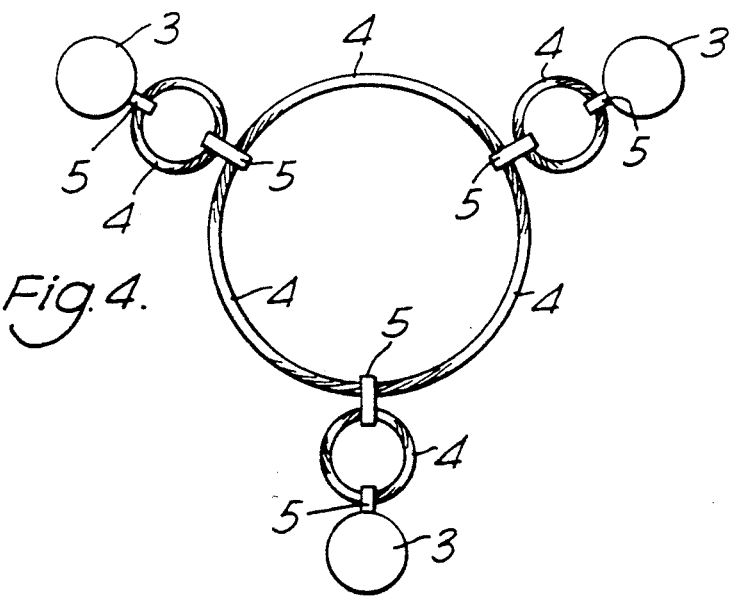
FIGS. 4, 5 and 6 are schematical elevational views illustrating three further embodiments of the invention.
Figure 7:
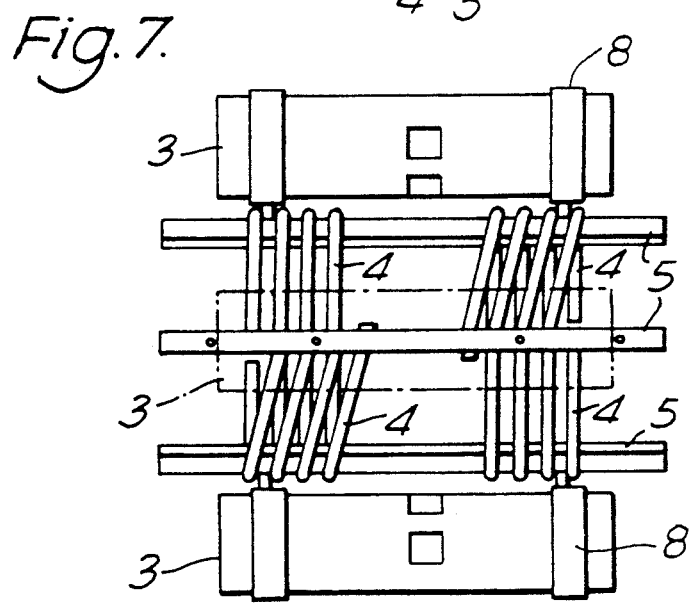
FIG. 7 is a detailed elevational view corresponding to FIGS. 2 and 3.

FIGS. 2, 3, and 7 illustrate details of the design of the device according to the invention. FIGS. 2 and 3 illustrate how an air gun 3 is, by the aid of clamping means 8 which are fastened to one of fastening means 5, rigidly connected with the resilient member. FIGS. 2 and 3 only differ by the fact that two divided resilient segments are provided on FIG. 3, whereas only one longer segment is used in FIG. 2. Lower fastening means 5 is then either connected with a rigid frame, as in FIGS. 5 and 6, or with a resilient frame, as in FIG. 4. In FIG. 4, which constitutes a combination of both previously described embodiments, a double spring is used.

In FIG. 7 a more detailed device of the kind as illustrated in FIG. 1A is shown, in which the resilient member 4 forms the frame proper, whereas the air guns are fastened to fastening means 5.

As will appear from the above disclosure, many modifications are obviously possible within the scope of the invention. Even though the invention is illustrated in the shown embodiments with the sources of energy provided on the outside of a frame structure, it is e.g. an obvious alternative to provide them inside the frame.

We claim:

1. A device for firmly holding sources of seismic energy suspended from buoyancy means in a predetermined pattern for use in seismic surveying in bodies of water when a plurality of said sources of seismic energy are used in mutual cooperating relationship comprising:
   means for suspending a plurality of seismic energy emitting devices from a buoyancy means;
   first rigid fastening means rigidly connected to each seismic energy emitting device; and
   a plurality of first substantially circular coaxially spaced flexible and resilient spring members for absorbing shock forces from said seismic energy emitting devices in all directions, connected to said rigid fastening means so that said spring members are totally external of and non-coaxially related to said seismic energy emitting devices to form an assembly of sources of seismic energy, said assembly being connected to said suspension means.

2. A device as claimed in claim 1 wherein said flexible resilient spring members and fastening means together form an integrated frame.

3. A device as claimed in claim 1 wherein:
   said plurality of seismic energy emitting devices are substantially circumferentially spaced around said first spring members; and
   said first rigid fastening means comprises a plurality of substantially circumferentially spaced rigid fastening members connected to said first spring members to form an integrated frame, said first fastening members connecting said seismic energy emitting devices to said spring members to form an integrated assembly wherein shock forces produced by said seismic energy emitting devices are absorbed in all directions by said spring members.

4. The device as claimed in claim 3 wherein:
   said first fastening members rigidly connect said seismic energy emitting devices to said first spring members.

5. The device as claimed in claim 3 and further comprising:
   a plurality of second substantially circular coaxially spaced flexible and resilient spring members substantially circumferentially spaced around said first spring members;

said first rigid fastening members connecting said seismic energy devices to said second spring members; and a plurality of second substantially circumferentially spaced rigid fastening members connecting said second spring members to said first spring members.

6. The device as claimed in claim 5 wherein:

said first and second fastening members rigidly connect said first and second spring members to said seismic energy emitting devices and to each other, respectively.

7. The device as claimed in claim 1 and further comprising:

a hollow rigid frame member having a circumference and a central axis; and wherein said plurality of first rigid fastening members are substantially circumferentially spaced around and rigidly connected to said frame member;

said plurality of first spring members are rigidly connected to each of said first fastening members so that said hollow frame member, said first fastening members and said first spring members form a frame assembly; and said seismic energy emitting devices are rigidly connected to a respective one of said first spring members so that shock forces produced by said seismic energy emitting devices are absorbed in all directions by said first spring members and said seismic energy emitting devices are substantially isolated from each other with respect to shock forces produced thereby.

8. The device as claimed in claim 7 wherein:

said spring members are arranged in a plurality of pairs spaced around said rigid frame member, each spring member of each pair being connected to said rigid frame member by a respective one of said fastening members; and each of said seismic energy emitting devices is connected to both spring members of a respective pair of said spring members.

9. The device as claimed in claim 1 wherein:

said seismic energy emitting devices comprise elongated elements;

said fastening members comprise elongated late members extending in the longitudinal direction of respective ones of said seismic energy emitting device; and said spring members each comprises a plurality of substantially circular spring elements connected in longitudinal spaced relationship along respective fastening members.

10. The device as claimed in claim 3 wherein:

said seismic energy emitting devices comprise elongated elements;

said fastening members comprise elongated plate members extending in the longitudinal direction of respective ones of said seismic energy emitting device; and said spring members each comprises a plurality of substantially circular spring elements connected in longitudinal spaced relationship along respective fastening members.

11. The device as claimed in claim 7 wherein:

said seismic energy emitting devices comprise elongated elements;

said fastening members comprise elongated plate members extending in the longitudinal direction of respective ones of said seismic energy emitting device; and said spring members each comprise a plurality of substantially circular spring elements connected in longitudinal spaced relationship along respective fastening members.

12. The device as claimed in claim 8 wherein:

said seismic energy emitting devices comprise elongated elements;

said fastening members comprise elongated plate members extending in the longitudinal direction of respective ones of said seismic energy emitting device; and said spring members each comprises a plurality of substantially circular spring elements connected in longitudinal spaced relationship along respective fastening members.

13. The device as claimed in claim 1 wherein:

said spring members comprise steel cable ring-shaped members.

14. The device as claimed in claim 3 wherein:

said spring members comprise steel cable ring-shaped members.

15. The device as claimed in claim 7 wherein:

said spring members comprise steel cable ring-shaped members.

16. The device as claimed in claim 11 wherein:

said spring members comprise steel cable ring-shaped members.

17. The device as claimed in claim 12 wherein:

said spring members comprise steel cable ring-shaped members.

* * * * *